United States Patent [19]

Knorre et al.

[11] 4,366,049

[45] Dec. 28, 1982

[54] PROCESS FOR RECYCLING OF USED LUBRICATING OILS

[75] Inventors: Helmut Knorre, Seligenstadt; Manfred Langer, Karlstein; Friedrich Fauser, Hammersbach; Willi Fischer, Seligenstadt, all of Fed. Rep. of Germany

[73] Assignees: Leybold-Heraeus GmbH, Cologne; Degussa Aktiengesellschaft, Frankfurt, both of Fed. Rep. of Germany

[21] Appl. No.: 192,561

[22] Filed: Sep. 30, 1980

[30] Foreign Application Priority Data

Oct. 6, 1979 [DE] Fed. Rep. of Germany ....... 2940630

[51] Int. Cl.³ ...................... C10G 7/00; C10M 11/00
[52] U.S. Cl. .................................... 208/179; 208/184
[58] Field of Search ............................... 208/179, 184

[56] References Cited

U.S. PATENT DOCUMENTS

| | | | |
|---|---|---|---|
| 4,101,414 | 7/1978 | Kim | 208/184 |
| 4,252,637 | 2/1981 | Knorre | 208/184 |
| 4,255,252 | 3/1981 | Knorre | 208/184 |

Primary Examiner—T. Tufariello
Attorney, Agent, or Firm—Beveridge, DeGrandi & Kline

[57] ABSTRACT

The object of the invention is a process for recycling used lubricating oils. After drying and gasoline removal, the oil is distilled and then treated with sodium or sodium hydride in a finely-divided state at elevated temperature. This is followed by a further distillation. Both distillations are at temperatures below 300° C., the oil fractions of low volatility being respectively distilled in a molecular distillation apparatus at below 2 mbar.

2 Claims, 2 Drawing Figures

PROCESS FOR RECYCLING OF USED LUBRICATING OILS

The invention relates to a process for recycling used lubricating oils, by treating the oil, pretreated by drying and gasoline removal, with finely divided sodium metal or sodium hydride at elevated temperature and distillation under gentle conditions.

BACKGROUND AND PRIOR ART

The recycling of used lubricating oils is a problem of increasing economic and ecological importance. The regeneration carried out even today on a large scale by the so-called acid tar process (sulfuric acid extraction and bleaching earth [fuller's earth] hot contact distillation) is unsatisfactory because of the associated waste problems (acid tar, bleaching earth filter cakes), technological problems (corrosion), and the poor yield. Another process has always been constantly sought which leads economically to high yields of high value second raffinates and is also environmentally favorable and produces as little waste as possible.

Particular attention was here directed to processes which operate completely without acid treatment. Mostly these are concerned with a succession of distillation, hydrogenation and filtration. Catalytic hydrogenation has not, of course, been able to be used because of the poisoning of the catalysts and on cost grounds.

Two further processes, described in German Patentschriften Nos. 1,105,543 and 2,508,713, carry out a chemical treatment with sodium metal, but however only partially alleviate the disadvantages mentioned above.

Thus it is still required, when the process according to DE-PS 1,105,543 is carried out, to process the used oil treated with sodium metal with a high added quantity of filter aids (bleaching earth), leading to high amounts of waste and considerable losses of yield. The process described in DE-PS 2,508,713 proposes processing of used mineral oil by purifying the used oil by coagulation and successively by dehalogenating with sodium metal, fractionally distilling, and hydrogenating. The high number of process steps already militates against economically carrying out this process, since losses of yield and waste problems are associated with each process step.

It is also known that the treatment of used oil with chemical reagents is per se undesirable, since these reagents are in general used up and finally appear in some form of waste.

It has thus also been proposed to process a used lubricating oil without chemical aids but only with distillative measures. It is proposed in German Offenlegungsschrift No. 2,628,763 to pre-distill a used oil for at least 4 hours below its cracking temperature, to dry it and to remove the light oil components, and to subject the predistilled material, below its cracking temperature, to a vacuum distillation under very low pressure. This distillation is to be carried out at a pressure of 0.1–2 mm of mercury in a molecular distillation apparatus in a temperature range of 249°–345° C. A yield of 91% is obtained. In practice it is of course found that only very few used oils, specially collected and with little contamination, can be processed by this process. Re-fining of the considerably more strongly contaminated used oils encountered in practice requires, on the other hand, a further treatment, also described in DE-OS 2,628,763, by the acid tar—bleaching earth—hot contact distillation process. Considerable losses of yield thus naturally result, and considerable quantities of wastes arise.

A certain amount of progress is obtained with the recently proposed "Recyclon-Process" ®, in which, after a dewatering and gasoline removal stage, a treatment is carried out with small amounts of finely divided sodium. For separation of the re-refined lubricating oil, two distillations are then carried out in a molecular distillation apparatus under gentle conditions. According to this process, a wide spectrum of used oils arising in practice can give high value raffinates.

A large part of the disadvantages attributed to the other processes can be eliminated. However, there still arises 18% of a highly alkaline, tarry residue in this process; the yield of usable re-raffinates if only about 77%.

A further improvement is obtained by modifications of the "Recyclon-Process" ®, which use the teachings of DE-OS 2,813,200. Here process water is added to the used oil after the sodium treatment. But 16% of residues still arise even in this process; the yield of usable re-raffinates is 83%, based on dried, gasoline-removed oil.

A used oil regeneration process was therefore sought which has a low chemicals requirement, produces little residue, can process a wide spectrum of used oils arising in practice, and simultaneously produces higher yields of technically satisfactory re-raffinates than the processes hitherto known.

SUMMARY OF THE INVENTION

According to the invention, a process is obtained in which used lubricating oil is reprocessed by treatment of the oil, pretreated by drying and gasoline removal, with finely-divided sodium metal or sodium hydride at elevated temperature, and distillation under gentle conditions, such that the oil is distilled, before and after the treatment with sodium metal or sodium hydride, at a temperature of less than 300° C., the difficultly evaporable part of the oil being respectively distilled in a molecular distillation apparatus at a working pressure of less than 2 mbar.

This operating method makes it possible to reduce the amount of metallic sodium added to below 0.5 wt.%, based on the amount of distilled pretreated oil. Simultaneously, yields of over 90% of reusable re-raffinates can be obtained.

BRIEF DESCRIPTION OF DRAWINGS

The invention is further illustrated in the drawings, wherein.

DETAILED DESCRIPTION OF INVENTION

Figure 1:
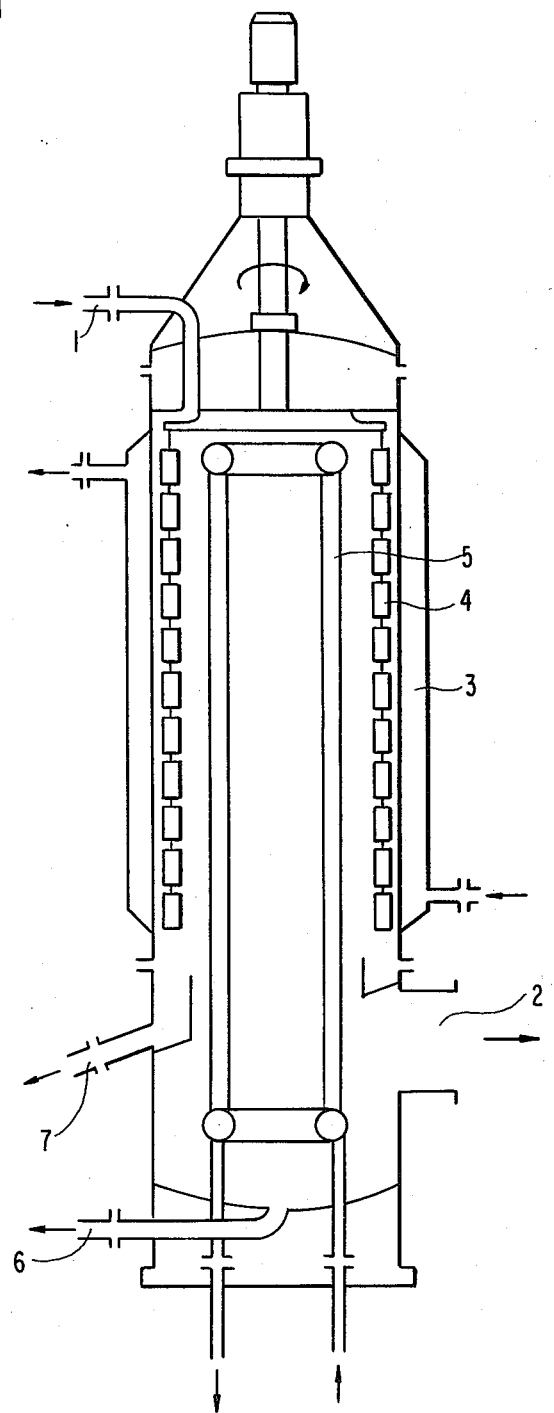
FIG. 1 is a schematic drawing of the molecular distillation apparatus.

In carrying out the process according to the invention it has been found to be important, in connection with the distillation of the dried and gasoline removed used oil under gentle conditions, not to exceed a working pressure of 2 mbar for the difficulty evaporable part of the oil. Temperatures are then sufficient for distillation which lie below 300° C. Thermal decomposition of the oil is thus practically excluded.

With particular advantage, because of the wide boiling range of the dried and gasoline removed oil, the distillation can proceed in two or more small distillation apparatuses connected one after the other, of which those in which the high boiling part of the oil is distilled off must be molecular distillation apparatuses.

In general, about 95% of distillate can be recovered in this first distillation. About 5% of the oil remains as viscous bottoms. According to the origin of the used oil and the operating conditions of the drying and gasoline removal apparatus, these values can fluctuate somewhat.

In the second process step, metallic sodium or sodium hydride, the former finely divided, the latter in commercial particle size, is added to the distillate.

The amount required, according to the origin of the oil to be recycled, is 0.1–0.5, preferably 0.2–0.4, wt.% of sodium metal or sodium hydride, based on the amount of distilled, pretreated oil.

The reaction conditions can be varied within wide limits; their choice depends to a large extend on the used oil used. Reaction temperatures of 100–300, preferably 180°–280° C., and reaction times of 1–20, preferably 2–10, minutes are sufficient.

The sodium metal is advantageously utilized with a particle diameter of at most 100 μm, preferably below 50 μm (microns). For this, the metal must be finely emulsified by conventional processes. Sodium hydride can be used directly in a corresponding commercial particle size.

The following separation of the re-refined oil from the undistillable residues resulting from the chemical reaction must take place at a temperature of less than 300° C., to prevent undesired cracking. The difficulty evaporable fraction of the oil must be distilled in a molecular distillation apparatus which operates at a temperature of less than 2 mbar and a temperature of less than 300° C.

The temperature here is to be understood as the temperature of the film wiped on the evaporation surface. This temperature is set by the heating of the evaporation surface. If the heating is with a heat transfer oil, as is currently usual, this must be heated to a higher temperature, the temperature difference being dependent on the technical design of the evaporator and on the evaporation rate.

In glass apparatuses and at low rates of evaporation, the temperature of the heat transfer medium is found to lie about 10°–20° C. above that of the film being evaporated; in steel apparatuses and at moderate evaporation rates, about 20°–30° C., and at high evaporation rates, e.g., 100 kg of oil per m²-h, up to about 50° C. above the film temperature.

The small amounts of volatile and gaseous materials arising in the treatment with sodium metal or sodium hydride are separated before the second distillation in a flash evaporator operating at atmospheric pressure or in vacuum; to destroy any unreacted sodium or sodium hydride still present, or highly reactive intermediate products arising in the reactor, some steam or water can be added to the evaporator. In a particularly advantageous manner, the following distillation under the gentle conditions according to the invention is combined with a fractionation of the re-raffinate, so that products of the desired density or viscosity classes, ready for use, are obtained without additional cost.

The yield of qualitatively high value re-raffinates, based on the once-distilled oil utilized for the sodium metal or sodium hydride treatment, is between 95 and 96% in the second distillation, so that an overall yield of over 90%, based on the amount of pretreated oil, is attained. With only slightly contaminated used oils, for the refining of which only a little sodium metal or sodium hydride is necessary, higher yields are achieved; more heavily contaminated oils which have to be treated with more reagent naturally give somewhat lower yields.

A further advantage of the process according to the invention is that the greatest part of the distillation residues is not loaded with sodium compounds and can be burnt in conventional heavy oil heating plants.

By molecular distillation apparatus is to be understood in the present connection an apparatus as shown in principle in FIG. 1 of the drawing and consisting of the following essential components: the product feed 1, the vacuum duct 2, the heated cylindrical thin layer jacket 3 on which the supplied product is distributed as a thin film by means of the rotating wiper blades 4, the internal condenser 5 on which the distillate is deposited, and two outlet ducts for distillate 6 and residue 7. The constructional design of such an apparatus is not critical in detail; however, it is crucial that the condenser is directly opposite the heated evaporation cylinder over the majority of its length. This gives large transfer cross sections for the vapors, and low vapor velocities occur even at the low pressures required for the gentle distillation.

The invention is illustrated by means of the following examples.

EXAMPLE 1

A dried and gasoline removed used oil of the following composition was used for the example:

Appearance: black

Elementary analysis: C 84.6%, H 13.0%, N (Dumas) 0.58%, S 0.94%, Cl 0.28%, (according to the Wickbold method) Br 0.1%, (S, Cl, Br);

Oxide ash 0.58%

Heavy metals (in ppm): Ca 783, Pb 615, Zn 328, Fe 289, Mg 61, Al 51, Cu 38, Sn, Mn, Ni, Cr, Sr less than 5

Water content (Karl Fischer titration) 0.09%

Bromine number (by DIN 51774): 2.4 g Br/100 g used oil

Average molecular weight (vapor pressure osmometric) 393±20

Viscosity (DIN 53015) 3.2°E (50° C.)=24 mm².s$^{-1}$

Neutralization number (DIN 51558): 0.90 mg KOH/g

Density (20° C.) 0.885 g/cm³

The sodium metal dispersion used for the example was produced from 1 part by weight of sodium metal and 2 parts by weight of spindle oil (viscosity at 50° C., 2.5°E) at 120° C. in a heatable 4-1-stirrer vessel, in which a disperser assembly (rotor-stator principle) ran at a peripheral speed of about 25 m/sec (corresponding to about 9,000 rpm with a rotor diameter of 55 mm). The average particle size was about 10 μm.

10.0 kg of dry oil were fed in, at a heat transfer oil temperature of 180° C. and a pressure of 1.6 mbar, and at a rate of 22 kg/h, to a molecular distillation apparatus with an evaporator surface of 0.1 m², and were spread on the evaporator surface with a wiper assembly running at 500 rpm. There were hence recovered 2.2 kg of a brown-colored distillate (fraction 1/1) and 7.8 of a black residue.

This residue was fed at a rate of 18.5 kg/m into a two-stage molecular distillationapparatus which operated at a heat transfer oil temperature of 250° C. and a pressure of 0.1 mbar in the first stage and at a heat transfer oil temperature of 310° C. and a pressure of 0.2 mbar in the second stage.

The following fractions were collected:

| Fraction ⅓, | dull brown, | 6.05 kg |
|---|---|---|
| Fraction ⅓, | dull brown, | 1.25 kg |
| Residue 1 | black, viscous | 0.50 kg. |

Fractions 1/1, 1/2 and 1/3 were mixed and investigated:

| Density (20° C.): | 0.875 g/cm$^3$ |
|---|---|
| Oxide ash | 0.13% |
| Viscosity (50° C.) | 3.0° E - 21 mm$^2$.s$^{-1}$ |
| Average molecular weight | 333 |
| Neutralization number | 0.76 mg KOH/g |

This mixture was heated to 230° and reacted with 0.3 wt.% sodium metal in the form of a 33% dispersion in spindle oil. After a reaction time of five minutes, 0.2 kg of steam was passed through the reactor in order to destroy unreacted sodium metal and reactive sodium metal deposition products, and to drive off the volatiles formed in the reaction.

The used oil treated in this manner was then separated into three fractions and residue (second distillation) in 3 steps in a molecular distillation apparatus of glass with an evaporation surface of 0.04 m$^2$:

| Molecular Still (stage) | Heat Transfer oil temp. °C. | Pressure (mbar) | Fraction Ref. | Qty. | Feed rate kg/h |
|---|---|---|---|---|---|
| 1 | 160 | 0.06 | 2/1 | 3.2 kg | 1.0 |
| 2 | 200 | 0.003 | 2/2 | 4.5 kg | 0.8 |
| 3 | 230 | 0.003 | 2/3 | 1.3 kg | 0.3 |
| Residue 2 | | | | 0.5 kg | |
| Total | | | | 9.5 kg | |

Fractions 2/1, 2/2 and 2/3 and their mixture had the following properties:

| Ref. | 2/1 | 2/2 | 2/3 | 2/1-2/3 |
|---|---|---|---|---|
| Color | pale yellow clear | bright yellow clear | yellow clear | yellow clear |
| Odor | | Mineral oil-typical | | |
| Density (20° C., g/cm$^3$) | 0.864 | 0.874 | 0.894 | 0.874 |
| Viscosity (50° C.) °E mm$^2$.s$^{-1}$ | 1.5 6.2 | 4.0 30 | 6.8 52 | 3.0 21 |
| Bromine number | — | 1.5 | 1.8 | 1.8 |
| Av. molecular wt. | — | — | — | 331 |
| Neutralization No. mg KOH/g | — | — | — | <0.01 |

EXAMPLE 2

Figure 2:
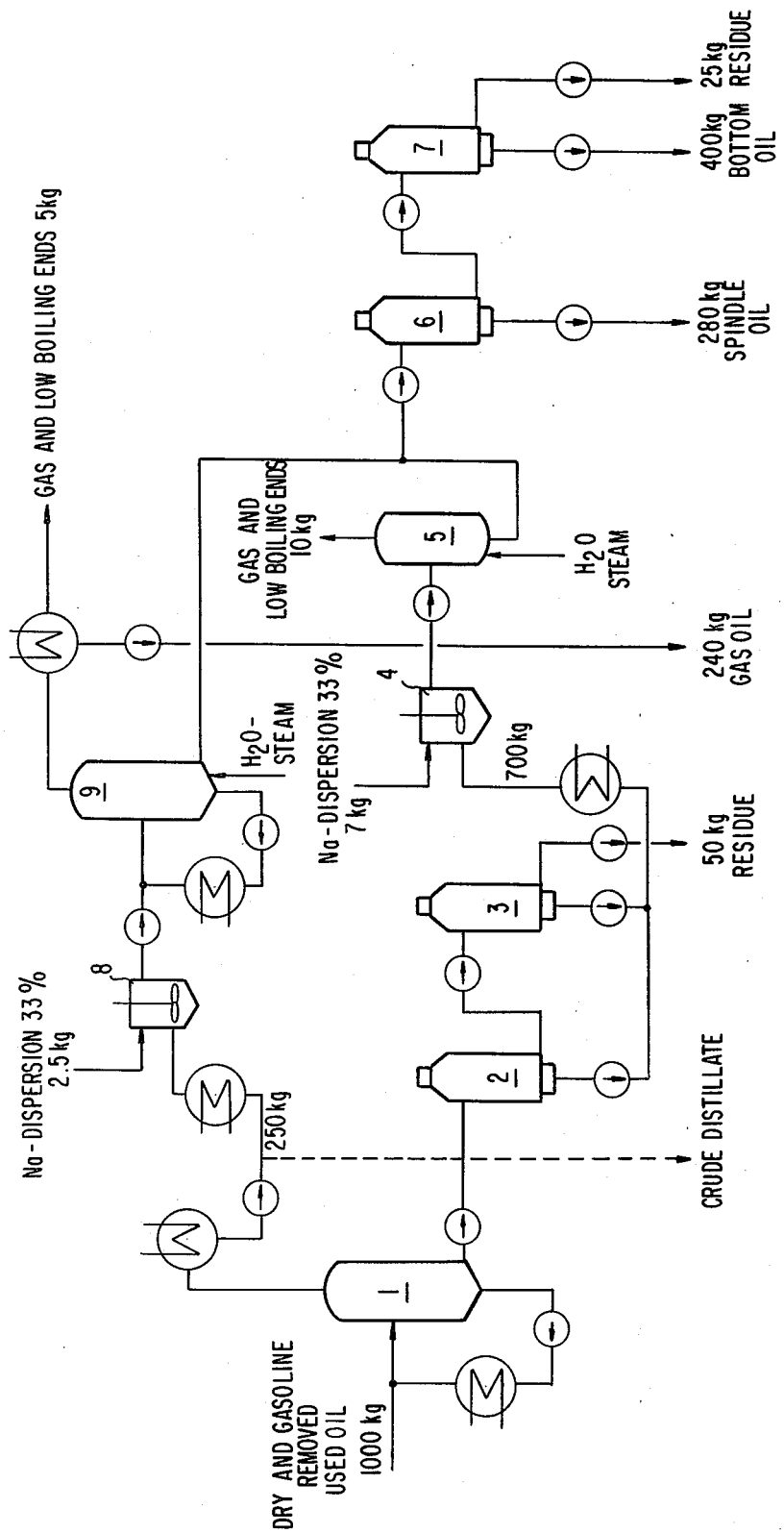
FIG. 2 is a flow diagram of the process of the invention.

An industrial embodiment of the process according to the invention is illustrated below in connection with the flowsheet given in FIG. 2.

Starting with 1,000 kg of oil, dried and with the gasoline removed, with a composition the same as that used for the laboratory trial, 250 kg of crude gas oil are distilled off in the flash evaporator 1 at 80 mbar and 230° C. This distillate can be fed directly to end uses. To produce a high-value, low sulfur gas oil, in a side stream of the plant the distillate is reacted in reactor 8 with 2.5 kg of Na dispersion at temperatures of about 220° C. for 5-7 minutes. Clean, low-sulfur gas oil, usable for example as light heating oil, is recovered (240 kg) in the stripper (flasher) evaporator 9, at a pressure of 150 mbar and at 220° C.

From the sump of the crude gas oil separator 700 kg of crude base oil is recovered in the two succeeding molecular stills 2 and 3. The temperatures in the heat transfer oil are at 300° C. and the pressures 0.2 mbar. 50 kg of residue 1, which can be utilized as heavy heating oil, remain.

The base oil distillate is reacted in reactor 4 with 7 kg of sodium dispersion at 250° C. for 5-7 minutes. The reaction mixture is then conducted to a flasher 5 and, with addition of steam, the gases and volatiles formed in the reaction are separated.

From the gas-free bottoms, 280 kg of spindle oil raffinate are produced in the molecular still 6 at a heating oil temperature of 220° C. and a pressure of 0.1 mbar; the bottoms may be mixed with the bottoms from the pure gas oil stripper 9.

400 kg of bottom oil raffinate of higher viscosity are separated in the molecular still 7 at a heat transfer oil temperature of 280° C. and a pressure of 0.1 mbar. There arise 25 kg of sodium-containing residue, which can be burned in a special furnace to produce the heat energy required in the process.

Further variations and modifications of the invention will be apparent to those skilled in the art from a study of the foregoing and will be encompassed by the claims appended hereto.

We claim:

1. A process for recycling used oils comprising:
   selecting used oil which has been dried and has had the gasoline removed,
   distilling said used oil at a temperature less than 300° C. to produce a distillate in a first stage,
   reacting said distillate with finely divided sodium metal or sodium hydride to produce a first reaction mixture,
   stripping said first reaction mixture with water or steam, in a first flasher,
   removing gas and low boiling ends in said first flasher,
   removing a residue from said first stage and treating said residue in at least one molecular still, at a temperature of less than 300° C. and at a pressure of less than 2 mbar,
   recovering crude base oil in said molecular still,
   contacting said crude base oil with finely divided sodium metal or sodium hydride to produce a second reaction mixture,
   conducting said second reaction mixture to a second flasher and injecting steam or water into said flasher to flash off volatives,
   recycling at least a portion of the bottoms of the said first flasher to the bottoms of the second flasher, and
   recovering the gas oil product from the first flasher.

2. The process as set forth in claim 1 wherein the bottoms of said second flasher are conveyed to at least one other molecular still for recovery of spindle oil, bottom oil and sodium containing residue.

* * * * *